United States Patent [19]
Tjandrasuwita

[11] Patent Number: 6,049,883
[45] Date of Patent: Apr. 11, 2000

[54] DATA PATH CLOCK SKEW MANAGEMENT IN A DYNAMIC POWER MANAGEMENT ENVIRONMENT

[76] Inventor: Ignatius B. Tjandrasuwita, 32421 Seaside Dr., Union City, Calif. 94587

[21] Appl. No.: 09/053,553

[22] Filed: Apr. 1, 1998

[51] Int. Cl.[7] .................................................. G06F 1/32
[52] U.S. Cl. ........................................................ 713/322
[58] Field of Search .................................. 713/400, 600, 713/300, 322, 601, 503; 326/93, 94, 101, 104

[56] References Cited

U.S. PATENT DOCUMENTS

| | | | |
|---|---|---|---|
| 4,802,136 | 1/1989 | Nose et al. | 365/238 |
| 4,999,528 | 3/1991 | Keech | 326/94 X |
| 5,585,745 | 12/1996 | Simmons et al. | 326/93 |
| 5,615,376 | 3/1997 | Ranganathan | 395/750 |
| 5,623,646 | 4/1997 | Clarke | 395/560 |
| 5,740,087 | 4/1998 | Smentek et al. | 364/707 |

*Primary Examiner*—Thomas M. Heckler
*Attorney, Agent, or Firm*—Nguyen & Associates

[57] ABSTRACT

A clock gating apparatus that is cost efficient and allows power conservation is presented. The clock gating apparatus is implemented to allow data paths, that are used to process data, to be enabled or disabled as desired while preventing the clock-skew problem. The clock gating apparatus includes a plurality of clock gating circuits, wherein one clock gating circuit is implemented for each data path. In a first embodiment, while all the data paths propagate data in a first direction and eventually merge together at a node, the clock gating circuits are connected together in a cascaded fashion to propagate a clock signal in a second direction opposite from the first direction. In a second embodiment, parallel data paths that are mutually exclusive of each other propagate data in a first direction and the clock gating circuits are connected together in a cascaded fashion to propagate a clock signal in a second direction opposite from the first direction.

20 Claims, 12 Drawing Sheets

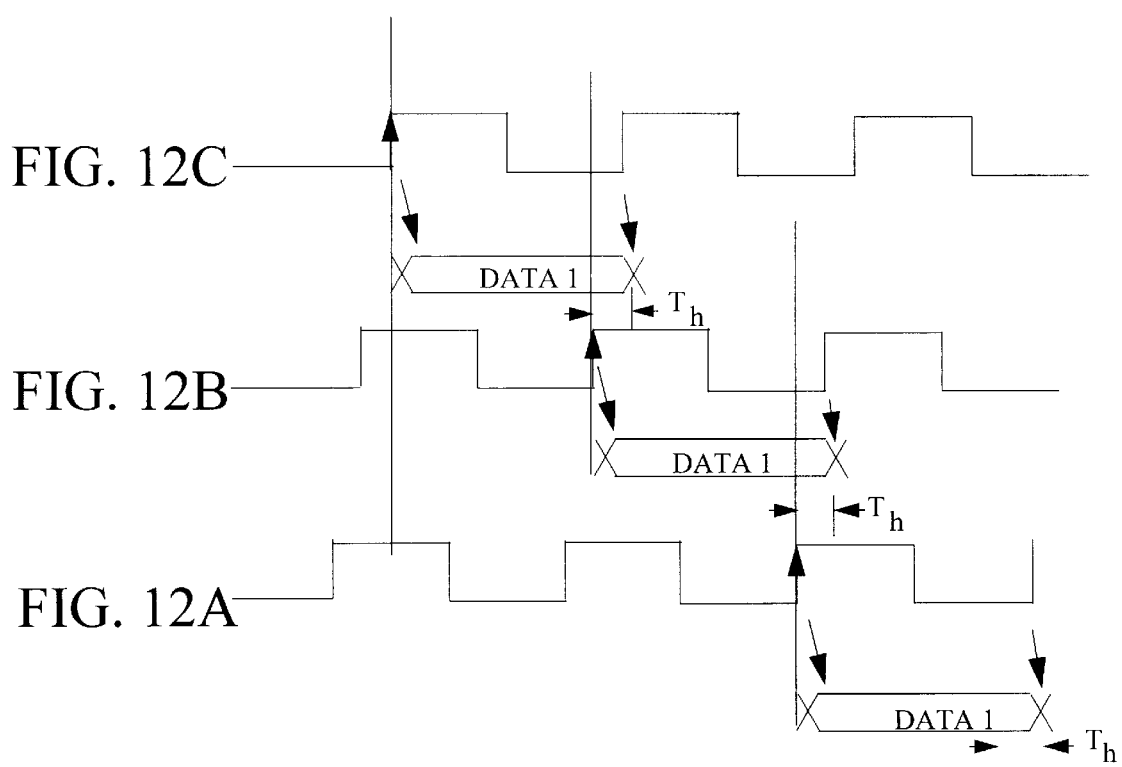

DATA PATH CLOCK SKEW MANAGEMENT IN A DYNAMIC POWER MANAGEMENT ENVIRONMENT

FIELD OF THE INVENTION

The invention generally relates to computer systems, and more particularly relates to computer power management through the use of clock gating circuitry.

BACKGROUND OF THE INVENTION

With the advances of semiconductor and computer technology, computer systems are becoming faster and at the same time smaller in size. Desk-top and even lap-top computer systems now possess processing speeds of main-frame computers that used to fill up a small room. Even hand-held computer systems such as personal digital assistants (PDA), which are becoming more popular, are getting more powerful. As computer systems become more miniaturized and inexpensive, more demands are constantly being required of them as well. For instance, they are being asked to perform more time-consuming and complex tasks involving graphics and video processing.

At the same time, as computer systems become more powerful and more miniaturized, power-conservation also presents a difficult challenge to overcome. Because of their small size, hand-held computer systems are powered by battery which have limited operating duration. Since more power is required for faster and more powerful processors, innovative solutions are required to conserve power and thereby extend the battery operating duration.

Within each computer system are many integrated circuits designed to perform different functions such as a memory controller, a hard disk controller, a graphics/video controller, a communications controller, and other peripheral controllers. As is well-known, each of these integrated circuits is supplied a clock signal to be used as a timing reference in synchronizing the operation of the integrated circuit. In general, power consumption increases as a result of the integrated circuit being clocked.

Periodically, an integrated circuit is not needed and is idle insofar as system functionality is concerned. At other times, while a sub-circuit (e.g., combination logic and data path) that performs data processing and transferring in the integrated circuit is still running, other sub-circuits in the integrated circuit are idle. Because these circuits continue to receive a clock signal, their respective internal circuits continue to be exercised and consume significant power, even while they remain idle. Accordingly, to conserve power, the clock signal to idle circuits is disabled through the use of clock gating circuitry.

Referring now to FIG. 1 illustrating a prior-art clock gating implementation. As shown in FIG. 1, integrated circuit 100 consists of two combinational logic circuits 101 and 102 each representing a data processing sub-circuit such as video and graphics circuits. The outputs of combinational logic circuits 101 and 102 are eventually combined into a single data path by combinational logic circuit 103 such as a mixer. The clock gating circuitry of integrated circuit 100 consists of AND-gate 107 and latches 104–106. AND-gate 103 receives as inputs enable signal EN and clock signal CLK. The output of AND-gate 107 is used in triggering latches 104–106. Data from external sources are provided as data inputs to combinational logic circuits 101 and 102. Upon processing their inputs, combinational logic circuits 101 and 102 provide their outputs to latches 104 and 105, respectively. Latches 104 and 105 provide their outputs to combinational logic circuit 103 which combines and processes the input data. Combinational logic circuit 103 provides its output to latch 106. Operationally, enable signal EN combines with AND-gate 103 to enable or disable the entire integrated circuit 100. AND-gate 103 and latches 104–106 combine to act as a gating circuitry for integrated circuit 100.

In such prior-art clock gating technique, the entire integrated circuit must either be enabled or disabled. While such use of clock gating circuitry can be achieved without any great complication, such prior-art method is inflexible and is not the most efficient power management technique since sub-circuits cannot be individually disabled.

Referring now to FIG. 2 illustrating another prior-art clock gating implementation. As shown in FIG. 2, integrated circuit 200 consists of two combinational logic circuits 201 and 202 each representing a data processing sub-circuit such as video and graphics circuits. The outputs of combinational logic circuits 201 and 202 are eventually combined into a single data path by combinational logic circuit 203 such as a mixer. The clock gating circuitry of integrated circuit 200 consists of AND-gates 204–206 and latches 207–209. AND-gates 204–206 receive as inputs enable signals EN1–EN3, respectively, and clock signal CLK. The outputs of AND-gates 204–206 are used in triggering latches 207–209. Data from external sources are provided as data inputs to combinational logic circuits 201 and 202. Upon processing their inputs, combinational logic circuits 201 and 202 provide their outputs to latches 207 and 208, respectively. The outputs of latches 207 and 208 are provided to combinational logic circuit 203 which combines and processes the input data. Combinational logic circuit 203 then provides its output to latch 209. Operationally, enable signals EN1–EN3 combine with AND-gates 204–206 to enable or disable the individual sub-circuits as well as the entire integrated circuit 200. Latches 207–209 and AND-gate 204–206 combine to act as clock gating circuitry for integrated circuit 200.

In this prior-art clock gating technique, clock gating circuitry is implemented for each sub-circuit in the integrated circuit to disable the clock signal to selected sub-circuits or the entire integrated circuit as desired. However, disabling the clock signal to part of an integrated circuit may cause clock skews (i.e., asynchronicity) between two sub-circuits with clock gating circuitry as well as between a sub-circuit with clock gating circuitry and one without. As is well known, clock skews may cause latching of invalid or wrong data. Clock skews may be rectified through the use of delay or inverter circuitry to ensure that sub-circuits with clock gating circuitry and the original clock signal are synchronized. For example, delays 211–212 may be placed at the outputs of AND-gates 204–205, respectively. The delays act to minimize the clock skew problem. In the alternate, inverter 210 may be placed at the output of AND-gate 206. The use of inverter 210 causes the processing time to be reduced by approximately half-clock which introduces a critical path. However, the use of delay or inverter circuitry 210–212 means that additional hardware costs are incurred in the fabrication of integrated circuits. Moreover, the use of delay circuitry such as delay 211–212 may also incur costly delays in the design of integrated circuits because the amount of clock skew is generally not determinable until after place-and-route operations are carried out on the integrated circuit.

Thus, a need exists for a clock gating power management system, apparatus, and method that is efficient and cost-effective.

SUMMARY OF THE INVENTION

Accordingly, the present invention provides a clock gating power management system, apparatus, and method that is efficient and cost-effective.

The present invention meets the above need with a clock gating apparatus which is connected to a plurality of data paths coupled to each other. The data paths are used to process data such that all data propagates in a first direction. The clock gating apparatus, itself, comprises clock gating circuits connected to each other in a cascading fashion such that a clock signal propagates in a second direction opposite that of the first direction. Each clock gating circuit is coupled to a corresponding one of the data paths thereby allows the clock gating circuit to enable or disable the corresponding data path as desired.

In one embodiment, the data paths are parallel data paths that eventually merge together into a single data paths. Moreover, in this embodiment, data can be processed and can propagate along more than one of the parallel data paths at any given time. In another embodiment, the data paths diverge from a common node. Additionally, data can be processed and can propagate along only one of the diverged data paths at any given time.

Each of the clock gating circuits further comprises a latch circuit and a logic-gate. The latch circuit is connected to the corresponding data path. The latch circuit's output is connected to a subsequent data path in the first direction. The logic-gate receives the cascaded clock signal and an enable or disable signal as inputs. The logic-gate provides an output to clock the latch circuit and a subsequent clock gating circuit in the second direction.

All the features and advantages of the present invention will become apparent from the following detailed description of its preferred embodiment whose description should be taken in conjunction with the accompanying drawings.

BRIEF DESCRIPTION OF THE DRAWINGS

FIGS. 12A–12C illustrating, as an example, the timing diagrams of the data path through TFT module 906.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in the area involving a graphics/display controller and a flat panel interface, it is to be appreciated that the present invention is also applicable to any application involving multiple data paths such as communications, core logic, central processing units (CPU), and others.

In accordance to a first embodiment of the present invention, by implementing a cascading clock gating circuitry that is propagating in a direction opposite from that of the propagating data in all the data paths and sub-paths which eventually merge at a common node, it is possible to selectively disable as well as enable individual data path and sub-path as desired. In this embodiment, one or more data paths that are in parallel with each other can process and propagate data at any given time. In accordance to the first embodiment of the present invention, because the clock skews of the data paths and sub-paths occur in a predictable and desirable sequence, no delay circuitry is needed to control the clock skew problems that may cause invalid data to be latched.

In this embodiment (i.e., a graphics/display controller), the present invention provides dynamic power management because it allows the video, graphics, or cursor data path to be individually enabled or disabled as desired. This is in comparison to the current prior-art where all of the data paths (e.g., the video, graphics, and cursor data path) are either turned on or off. Such prior-art is power inefficient. As an example of the prior-art inefficiency, consider the cursor data path in a graphics/display. In general, the cursor area is very small. More specifically, on each display line, the cursor data only requires between 1%–2% of the display line width. As such, in accordance to the present invention, outside of that cursor area (e.g., between 98%–99% of the display line width), the clock driving the cursor data path can be dynamically powered down thereby saving a lot of power. Compare this aspect of the present invention with the prior-art where the cursor data path is clocked all the time (e.g., for the entire display line). Just as significant as the power conservation aspect of the present invention, however, is the aspect that the present invention prevents the clock skew problem that normally plagues prior-art clock gating circuits.

Figure 1:
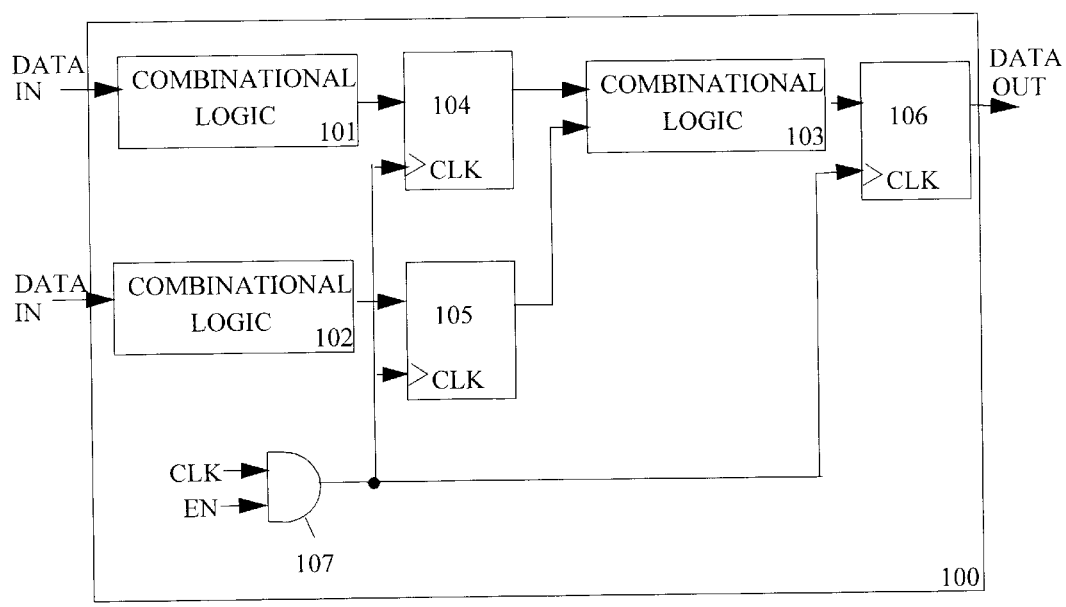
FIG. 1 illustrates a prior-art clock gating implementation.
Figure 2:
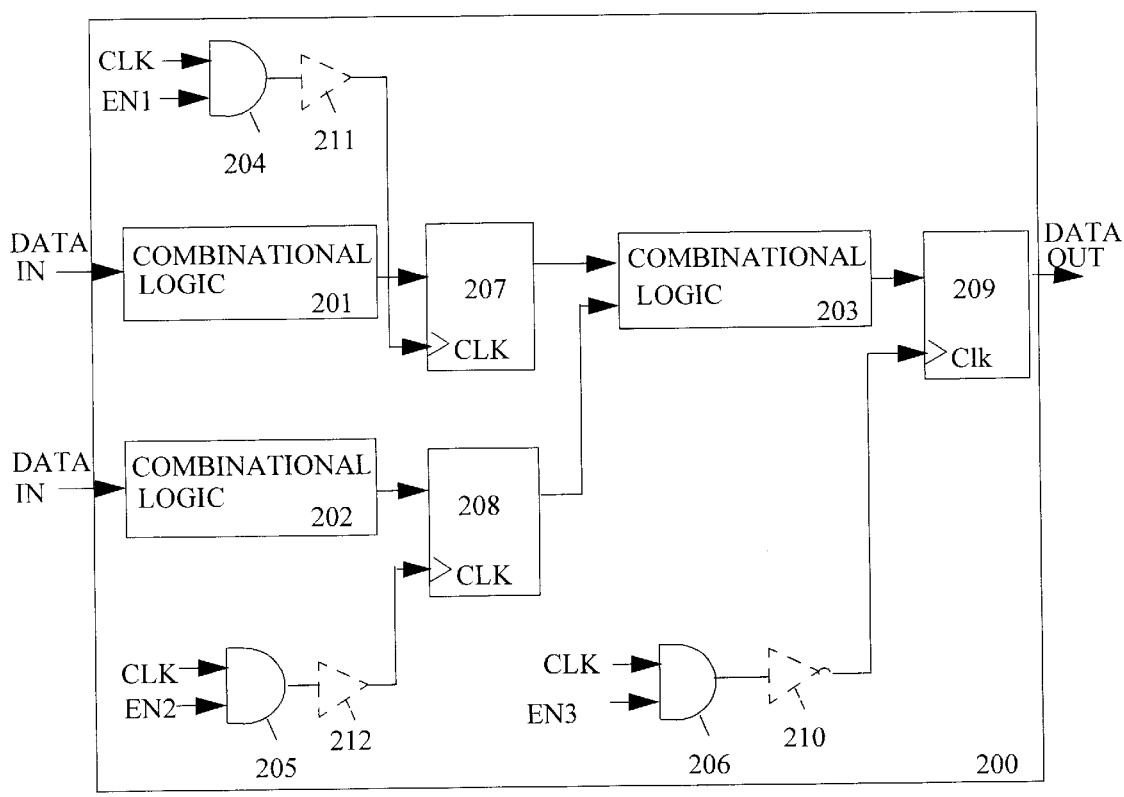
FIG. 2 illustrates another prior-art clock gating implementation.
Figure 3:
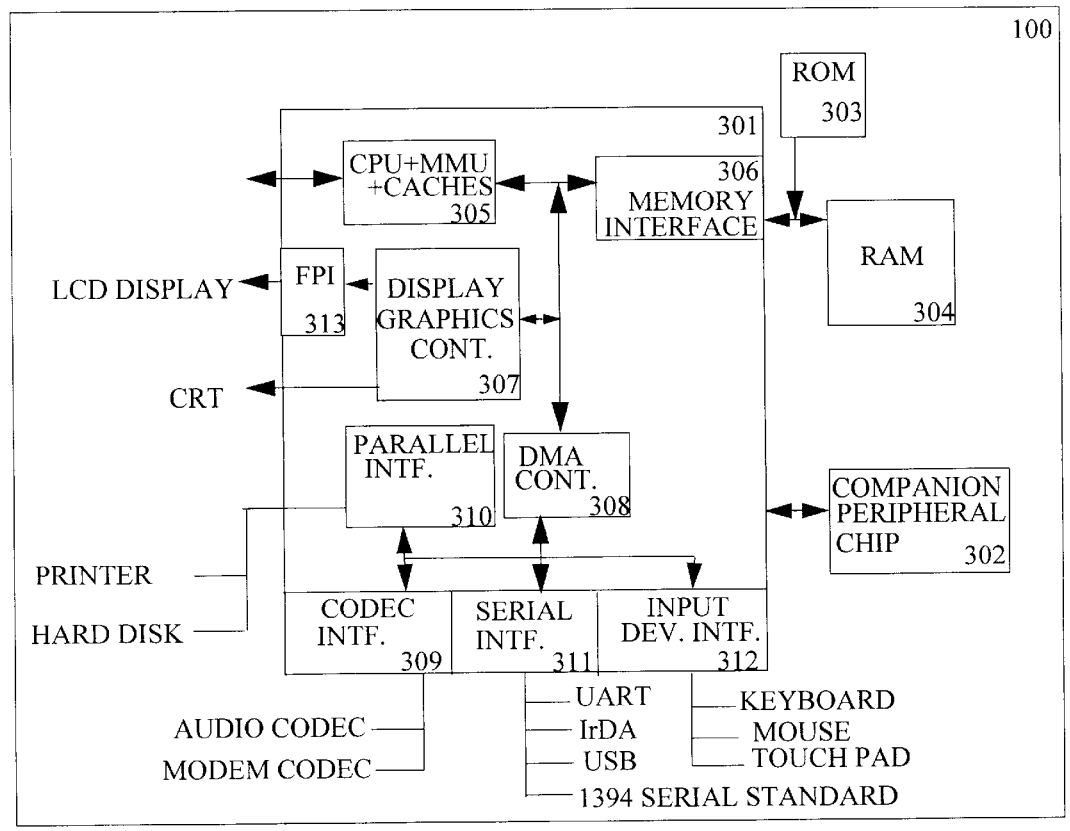
FIG. 3 is a high-level block diagram illustrating a typical computer system that implements the present invention.

FIG. 3 illustrates, for example, a high-level diagram of computer system 300 upon which the present invention may be implemented or practiced. More particularly, computer system 300 may be a lap-top or hand-held computer system. It is to be appreciated that computer system 300 is exemplary only and that the present invention can operate within a number of different computer systems including desk-top computer systems, general purpose computer systems, embedded computer systems, and others.

As shown in FIG. 3, computer system 300 is a highly integrated system which includes of integrated processor circuit 301, peripheral controller 302, read-only-memory (ROM) 303, and random access memory (RAM) 304. The highly integrated architecture allows power to be conserved. Computer system architecture 300 may also include a peripheral controller if there is a need to interface with complex and/or high pin-count peripherals that are not provided in integrated processor circuit 301.

While peripheral controller 302 is connected to integrated processor circuit 301 on one end, ROM 303 and RAM 304 are connected to integrated processor circuit 301 on the other end. Integrated processor circuit 301 comprises a processing unit 305, memory interface 306, graphics/display controller 307, direct memory access (DMA) controller 308, and core logic functions including encoder/decoder (CODEC) interface 309, parallel interface 310, serial interface 311, input device interface 312, and flat panel interface (FPI) 313. Processing unit 305 integrates a central processing unit (CPU), a memory management unit (MMU), together with instruction/data caches.

CODEC interface 309 provides the interface for an audio source and/or modem to connect to integrated processor circuit 301. Parallel interface 310 allows parallel input/output (I/O) devices such as hard disks, printers, etc. to connect to integrated processor circuit 301. Serial interface 311 provides the interface for serial I/O devices such as universal asynchronous receiver transmitter (UART) to connect to integrated processor circuit 301. Input device interface 312 provides the interface for input devices such as keyboard, mouse, and touch pad to connect to integrated processor circuit 301.

DMA controller 308 accesses data stored in RAM 304 via memory interface 306 and provides the data to peripheral devices connected to CODEC interface 309, parallel interface 310, serial interface 311, or input device interface 312. Graphics/display controller 307 requests and accesses the video/graphics data from RAM 304 via memory interface 306. Graphics/display controller 307 then processes the data, formats the processed data, and sends the formatted data to a display device such as a liquid crystal display (LCD), a cathode ray tube (CRT), or a television (TV) monitor.

If the display device is a LCD, processed data from graphics/display controller 307 is first sent to flat panel interface 313 before being passed on to the LCD. Flat panel interface 313 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, flat panel interface 313 formats the data to suit the type of display. Furthermore, FPI 313 allows color data to be converted into monochrome data in the event a monochrome LCD is used. If the display device is a cathode ray tube (CRT), processed data is provided to a digital-to-analog converter (DAC) prior to being sent to the CRT. In computer system 300, a single memory bus is used to connect integrated processor circuit 301 to ROM 303 and RAM 304.

Figure 4:
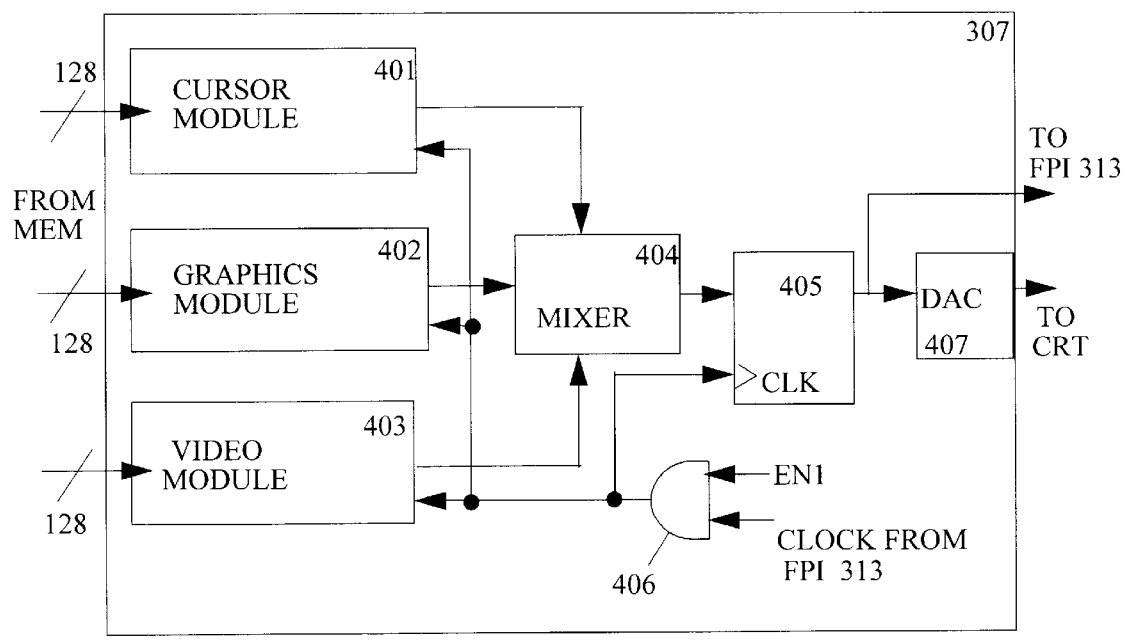
FIG. 4 is a block diagram illustrating in more details graphics/display controller 307 of FIG. 3.

In the first embodiment, the invention is implemented as part of graphics/display controller 307. Reference is now made to FIG. 4 illustrating graphics/display controller 307 in more details. In general, graphics/display controller 307 consists of three modules: hardware cursor 401, graphics 402, and video 403 which are used to process corresponding bitmap data types received from memory (i.e., ROM 303 or RAM 304) via memory interface 306. As such, graphics/display controller 307 has three separate internal data paths.

In accordance to the first embodiment of the present invention, the bitmap data associated with hardware cursors, graphics, and video are processed separately prior to being merged together and provided to mixer 404. Mixer 404 implements a priority display scheme between hardware cursors (e.g., mouse's position), graphics (e.g., software generated images and backgrounds), and video (e.g., motion pictures and images). The output of mixer 404 is provided to latch circuit 405 which controls the flow of display data to FPI 313. If a cathode ray tube (CRT) is used instead of a flat panel display, a DAC such as DAC 407 may be incorporated to convert digital display data into analog signals for display.

Latch circuit 405 is clocked by the output of AND-gate 406 which receives as inputs a propagated clock signal from FPI 313 and enable signal EN1. In so doing, AND-gate 406 outputs a HIGH signal when both the propagated clock signal and enable signal EN1 are HIGH. Otherwise, AND-gate 406 outputs a LOW signal. In other words, latch circuit 405 and AND-gate 406 combine to act as a clock gating circuitry to enable or disable graphics/display controller 307 (otherwise known as the first stage). Enable signal EN1 may originate from a control register (not shown) that is programmed by the CPU of processing unit 305 or from a power management circuit (also not shown). In accordance to the present invention, the flow direction of display data is opposite that of the propagated clock signal. While the clock gating circuitry in the present embodiment is implemented using AND-gates and enable signals (e.g., AND-gate 406 and enable signal EN1), it is clear to a person of ordinary skill in the art that a clock gating circuitry can equally be implemented using OR-gates and disable signals or other combinations of logic-gates.

Figure 5:
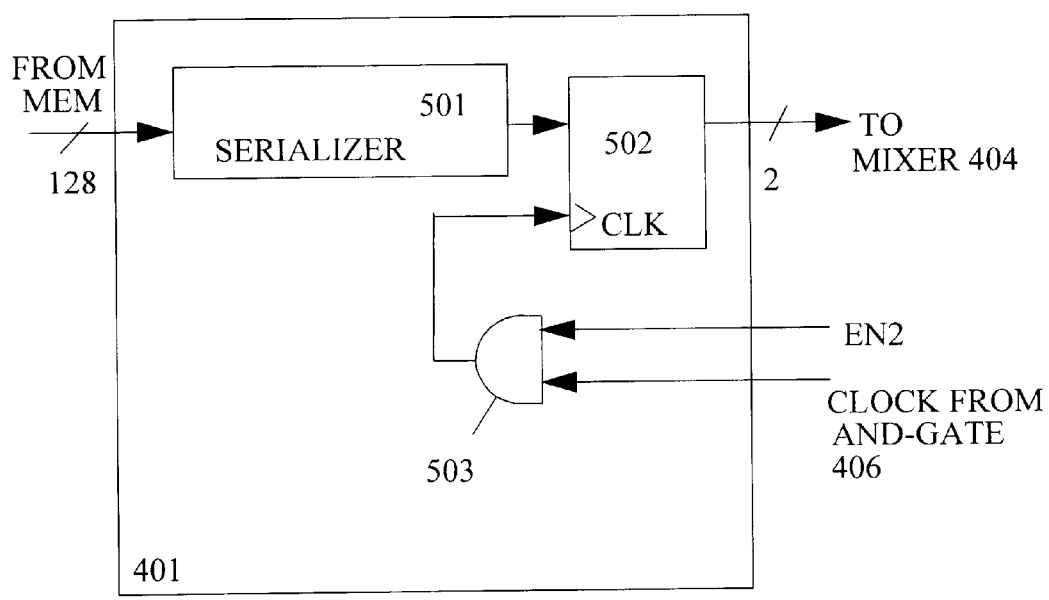
FIG. 5 is a block diagram illustrating in more details hardware cursor module 401 of FIG. 4.

Referring now to FIG. 5 illustrating in more details hardware cursor module 401. As shown in FIG. 5, hardware cursor module 401 includes serializer 501, latch circuit 502, and AND-gate 503. In the preferred embodiment, latch circuit 502 is a D-type latch circuit. However, it is to be appreciated that other master-slave latch types may be employed as well.

Serializer 501 receives as input information data signals from memory interface 306. While memory interface can have any width, in this embodiment, memory interface 306 has a 128-bit wide interface. In this embodiment, each pixel of a hardware cursor is represented by 2-bits of data. Therefore, there are 64 pixels in 128 data bits. Accordingly, serializer 501 converts the 128-bit wide data stream into a 2-bit wide serial data stream wherein serializer 501 outputs 2-bits of data for every clock cycle. The output of serializer 501 is provided as an input to latch circuit 502 which is driven by an output of AND-gate 503. AND-gate 503 has as its inputs a propagated clock signal from AND-gate 406 and enable signal EN2. Latch circuit 502 is capable of handling 2 data bits concurrently. It should be clear to a person of ordinary skill in the art that latch circuit 502 can easily be designed using a combination of D-type latches or other types of latches.

Like its counterpart, enable signal EN1, enable signal EN2 which may originate from a bit in a control register (not shown) that is programmed by the CPU of processing unit 305 or from a power management circuit (not shown) that enables cursor logic during cursor active area. AND-gate 503 generates a HIGH signal when both the propagated clock signal and enable signal EN1 are HIGH. Otherwise, AND-gate 503 outputs a LOW signal. As such, AND-gate 503 and latch circuit 502 combine to act as the clock gating circuitry for hardware cursor module 401 (known as the second stage) which allows hardware cursor module 401 to be enabled or disabled as desired. The output of latch circuit 501 is provided to mixer 404.

Figure 6:
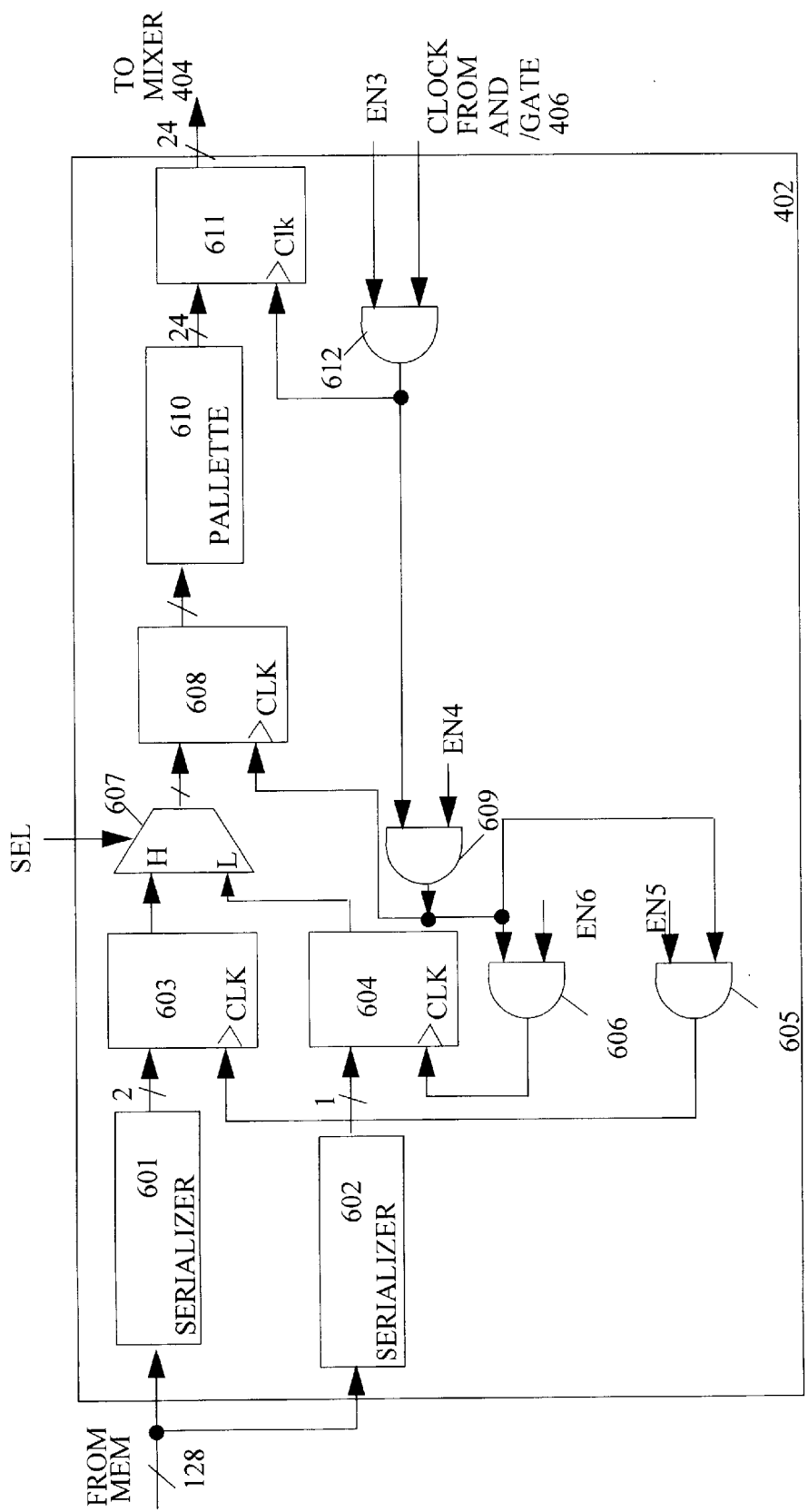
FIG. 6 is a block diagram illustrating in more details graphics module 402 of FIG. 4.

Referring now to FIG. 6 illustrating in more details graphics module 402. As shown in FIG. 6, graphics module 402 includes serializer 601, serializer 602, latch circuit 603, latch circuit 604, AND-gate 605, AND-gate 606, multiplexer 607, latch circuit 608, AND-gates 609, color palette 610, latch circuit 611, and AND-gate 612. In the preferred embodiment, latch circuits 603, 604, 608, and 611 are D-type latches. However, it is to be appreciated that other latch types may be employed as well.

AND-gates 605, 606, 609, and 612 are connected together in a cascade fashion. More specifically, AND-gates 605 and 606 receive as inputs the output of AND-gate 609 which in turn receive as an input the output of AND-gate 612. AND-gate 612 receives as one input the output of AND-gate 406. The other inputs of AND-gates 605, 606, 609, and 612 are connected to enable signals EN5, EN6, EN4, and EN3 respectively. As will be discussed in more details below, the outputs of AND-gates 605, 606, 609, and 612 are used to drive latch circuits 603, 604, 608, and 611 respectively. The sub-circuits driven by AND-gates 605 and 606 are referred collectively as the fourth stage, the sub-circuits driven by AND-gates 609 are referred to collectively as the third stage, and the sub-circuits driven by AND-gate 612 are referred to collectively as the second stage. Hence, the different stages of graphics module 402 can be selectively disabled using enable signals EN3–EN6. As shown, it is clear that the flow direction of display data is opposite that of the propagated clock signal.

Serializers 601 and 602 receive as input information data signals from memory interface 306. As discussed earlier, while memory interface 306 may have any width, in this embodiment, memory interface 306 has a 128-bit wide interface to ensure expeditious data transfer and reduced bottlenecks. In this embodiment, graphics module 402 is designed to handle different resolution modes including 1-bit per pixel and 2-bits per pixel. As such, graphics module 402 have multiple data sub-paths wherein each data sub-path is used to process graphics data for a different resolution mode. It should be clear to a person of ordinary skill in the art that graphics module 402 can be easily modified to handle other resolution modes such as 8-bit, 16-bit, 24-bit, 32-bit per pixel and others.

Accordingly, serializer 601 is used to convert the 128-bit wide data stream input into a 2-bit wide serial data stream output and serializer 602 is used to convert the 128-bit wide data stream input into a 1-bit wide serial data stream output. The output of serializer 601 is provided as an input to latch circuit 603 which is driven by an output of AND-gate 605. Latch circuit 603 is capable of handling 2 data bits concurrently. It should be clear to a person of ordinary skill in the art that latch circuit 603 can easily be designed using a combination of D-type latches or other types of master-slave latches.

AND-gate 605 has as its inputs a propagated clock signal (from AND-gates 609) and enable signal EN5 which may originate from a bit in the control register (not shown) that is programmed by the CPU of processing unit 305 or from a power management circuit (not shown). AND-gate 605 generates a HIGH signal when both the propagated clock signal and enable signal EN5 are HIGH. Otherwise, AND-gate 605 outputs a LOW signal. As such, AND-gate 605 and latch circuit 603 combine to act as the clock gating circuitry for the 2-bits per pixel data path inside graphics module 402 (part of the fourth stage). The output of latch circuit 603 is provided as an input to multiplexer 607.

Similarly, the output of serializer 602 is provided as an input to latch circuit 604 which is driven by an output of AND-gate 606. AND-gate 606 has as its inputs a propagated clock signal (from AND-gates 609) and enable signal EN6 which may originate from a bit in the control register (not shown) that is programmed by the CPU of processing unit 305 or from a power management circuit (not shown). AND-gate 606 generates a HIGH signal when both the propagated clock signal and enable signal EN6 are HIGH. Otherwise, AND-gate 606 outputs a LOW signal. As such, AND-gate 606 and latch circuit 604 combine to act as the clock gating circuitry for the 1-bit per pixel data path inside graphics module 402 (part of the fourth stage). The output of latch circuit 604 is provided as a second input to multiplexer 607.

Depending on the selected mode indicated by select signal SEL, multiplexer 607 allows either the output of latch circuit 603 or the output of latch circuit 604 to pass through to its output. Select signal SEL may originate from the control register (not shown) that is programmed by the CPU. In the preferred embodiment, if select signal SEL is HIGH indicating that the desired graphics resolution mode is 2-bit per pixel, the output of latch circuit 603 is allowed to pass through to the output. On the other hand, if select signal SEL is LOW indicating that the desired graphics resolution mode is 1-bit per pixel, the output of latch circuit 604 is allowed to pass through to the output.

The output of multiplexer 607 is provided as an input to latch circuit 608 which is driven by the outputs of AND-gates 609. It should be clear to a person of ordinary skill in the art that latch circuit 608 can easily be designed using a combination of D-type latches or other types of latches. AND-gate 609 has as its inputs a propagated clock signal (from AND-gate 612) and enable signal EN4 which may originate from a bit in the control register (not shown) that is programmed by the CPU of processing unit 305 or from a power management circuit (not shown). AND-gate 609 generates a HIGH signal when both the propagated clock signal and enable signal EN4 are HIGH. Otherwise, AND-gate 609 outputs LOW signal. As such, AND-gates 609 and latch circuit 608 combine to act as the clock gating circuitry for multiplexer 607 (the third stage).

The outputs of latch circuit 608 are provided as input to color palette 610 to color-map graphics data. In the preferred embodiment, color palette 610 is a look-up-table implemented using a random access memory (ReM). Using the graphics data from latch circuit 608 as an index, color palette 610 is used to look up corresponding color graphics pixel data. Preferably, each color graphics pixel retrieved from color palette 610 is represented by 24-bits RGB, 8 bits for red, 8 bits for green, and 8 bits for blue.

The output of color palette 610 is provided as an input to latch circuit 611 which is driven by an output of AND-gate 612. Latch circuit 611 is capable of handling 24 data bits concurrently. It should be clear to a person of ordinary skill in the art that latch circuit 611 can easily be designed using a combination of D-type latches or other types of latches. AND-gate 612 has as its inputs a propagated clock signal (from AND-gate 406) and enable signal EN3 which may originate from a bit in the control register (not shown) that is programmed by the CPU of processing unit 305 or from a power management logic circuit (not shown). AND-gate 612 generates a HIGH signal when both the propagated clock signal and enable signal EN3 are HIGH. Otherwise, AND-gate 612 outputs a LOW signal. As such, AND-gate 612 and latch circuit 611 combine to act as the clock gating circuitry for color palette 610 (the second stage). The output of latch circuit 611 is provided as an output to mixer 404.

Figure 7:
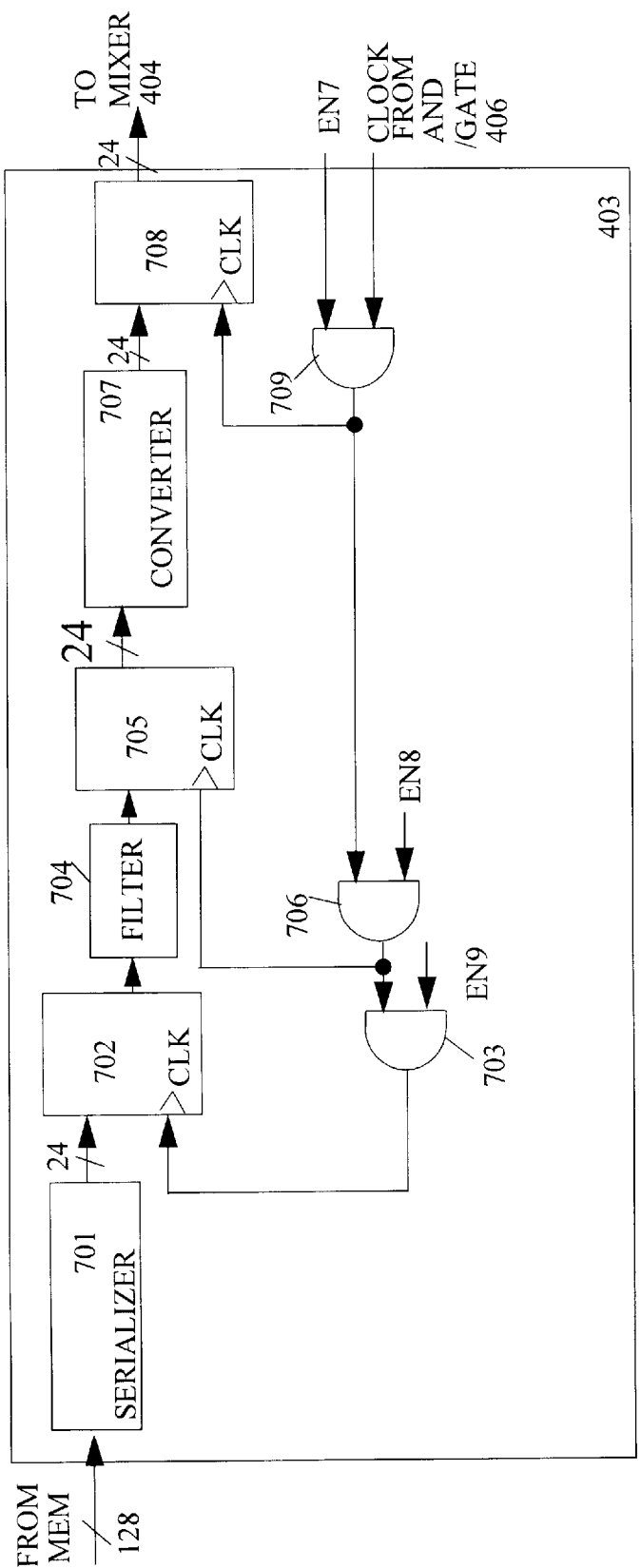
FIG. 7 is a block diagram illustrating in more details video module 403 of FIG. 4.

Reference is now made to FIG. 7 illustrating video module 403. Video module 403 includes serializer 701, latch circuit 702, AND-gate 703, digital horizontal-vertical filter 704, latch circuit 705, AND-gate 706, color space converter 707, latch circuit 708, and AND-gate 709. In the preferred embodiment, latch circuits 702, 705, and 708 are D-type latches. However, it is to be appreciated that other latch types may be employed as well.

Like their counterparts in graphics module 402, AND-gates 703, 706, and 709 are connected together in a cascade fashion. More specifically, AND-gate 703 receive as inputs the output of AND-gate 706 which in turn receives as an input the output of AND-gate 709. AND-gate 709 receives as one input the output of AND-gate 406. The other inputs of AND-gates 703, 706, and 709 are connected to enable signals EN9, EN8, and EN7 respectively. As will be discussed in more details below, the outputs of AND-gates 703, 706, and 709 are used to drive latch circuits 702, 705, and 708 respectively. The sub-circuits driven by AND-gate 706 are referred collectively as the fourth stage, the sub-circuits driven by AND-gate 703 are referred to collectively as the third stage, and the sub-circuits driven by AND-gate 709 are referred to collectively as the second stage. Hence, the different stages of video module 403 can be selectively disabled using enable signals EN7–EN9. As shown, it is clear that the flow direction of display data is opposite that of the propagated clock signal.

Serializer 701 receives as input information data signals from memory interface 306. As discussed earlier, while memory interface 306 may have any width, in this embodiment, memory interface 306 has a 128-bit wide interface to ensure expeditious data transfer and reduced bottlenecks. In the preferred embodiment, video module 403 is designed for the widely-used 16-bits per pixel 422 YUV and 422 YCrCb color space formats. In these color space formats, each color pixel comprises a luminance or brightness component and a chrominance or hue and saturation component. For example, in the YCrCb color space, Y is the luminance color space component and Cr, Cb are the chrominance sub-components. It should be clear to a person of ordinary skill in the art that video module 403 can be easily modified to handle other video data formats.

Accordingly, serializer 701 is used to convert the 128-bit wide data stream input into a 24-bit wide serial data stream output. Serializer 701 also performs horizontal scaling. The output of serializer 701 is provided as an input to latch circuit 702 which is driven by an output of AND-gate 703. Latch circuit 702 is capable of handling 24 data bits concurrently. It should be clear to a person of ordinary skill in the art that latch circuit 702 can easily be designed using a combination of D-type latches or other types of latches. AND-gate 703 has as its inputs a propagated clock signal (from AND-gate 706) and enable signal EN9 which may originate from a bit in the control register (not shown) that is programmed by the CPU of processing unit 305 or from a power management logic circuit (not shown). AND-gate 703 generates a HIGH signal when both the propagated clock signal and enable signal EN9 are HIGH. Otherwise, AND-gate 703 outputs a LOW signal. As such, AND-gate 703 and latch circuit 702 combine to act as the clock gating circuitry for serializer 701 (the fourth stage). The output of latch circuit 702 is provided as an input to digital horizontal-vertical filter 704.

Horizontal-vertical filter 704 is used to improve pixel/signal quality due to image scaling in both the vertical and horizontal directions. The output of horizontal-vertical filter 704 is provided as an input to latch circuit 705 which is driven by an output of AND-gate 706. Latch circuit 705 is capable of handling 24 data bits concurrently. It should be clear to a person of ordinary skill in the art that latch circuit 705 can easily be designed using a combination of D-type latches. AND-gate 706 has as its inputs a propagated clock signal (from AND-gate 709) and enable signal EN8 which may originate from a bit in the control register (not shown) that is programmed by the CPU of processing unit 305 or from a power management logic circuit (not shown). AND-gate 706 generates a HIGH signal when both the propagated clock signal and enable signal EN8 are HIGH. Otherwise, AND-gate 706 outputs a LOW signal. As such, AND-gate 706 and latch circuit 705 combine to act as the clock gating circuitry for horizontal-vertical filter 704 (the third stage). The output of latch circuit 705 is provided as an input to color space converter 707.

Color space converter 707 is used in converting the video data from either color space YUV or YCrCb to the RGB color space, wherein each color pixel comprises a red component, a green component, and a blue component, for display purposes. The output of color space converter 707 is provided as an input to latch circuit 708 which is driven by an output of AND-gate 709. AND-gate 709 has as its inputs a propagated clock signal (from AND-gate 406) and enable signal EN7 which may originate from a bit in the control register (not shown) that is programmed by the CPU of processing unit 305 or from a power management logic circuit (not shown). AND-gate 709 generates a HIGH signal when both the propagated clock signal and enable signal EN7 are HIGH. Otherwise, AND-gate 709 outputs a LOW signal. As such, AND-gate 709 and latch circuit 708 combine to act as the clock gating circuitry for color space converter 707 (the second stage). The output of latch circuit 708 is provided as an input to mixer 404. As such, mixer 404 acts as the destination node that merges the outputs from cursor module 401, graphics module 402, and video module 403 into a common data path.

As discussed earlier, mixer 404 carries out a priority display scheme between video images, graphics images, and cursor images. In other words, mixer 404 determines according to a predetermined scheme what image type has display priority and can therefore lay on top of the other image types in the event they are to be concurrently displayed at the same screen position. Mixer 404 provides its output to latch circuit 405 which is driven by AND-gate 406.

Figure 8:
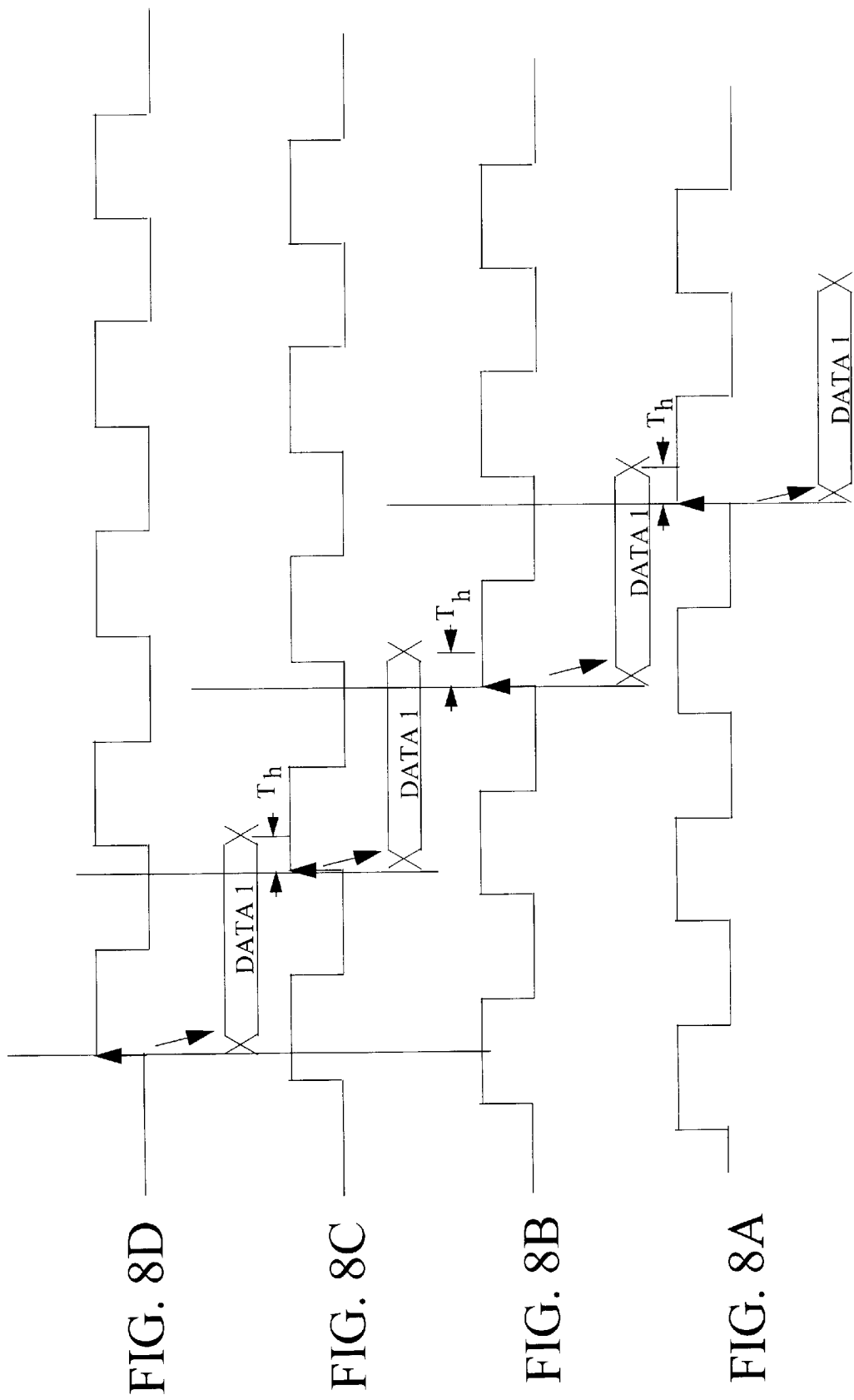
FIGS. 8A–8D illustrate, as examples, timing diagrams associated with relevant components of graphics module 402.

Referring now FIGS. 8A–8D illustrating as examples the timing diagrams of graphics module 402 and mixer logic 404. More specifically, FIG. 8A illustrates the output of AND-gate 406 and the output of latch 405 (i.e., the first stage), FIG. 8B illustrates the output of AND-gate 612 and the output of latch 611 (i.e., the second stage), FIG. 8C illustrates the output of AND-gate 609 and the output of latch 608 (i.e., the third stage), and FIG. 8D illustrates the output of AND-gate 605 or 606 and the output of latch 603 or 604, respectively, (i.e., the fourth stage). It is clear to a person of ordinary skill in the art that similar timing diagrams of cursor module 401 and video module 403 can be easily constructed. As such for brevity and clarity, timing diagrams of video module 401 and 403 are not presented here.

As discussed earlier, due to the cascading arrangement of the clock signals provided to the latches in graphics module 402 which propagate in a direction 180 degree opposite from the direction of the propagating data, the clock signals of the aforementioned four stages occur in an orderly sequence (i.e., the first, second, third, and then fourth) and propagate in a direction opposite from that of the propagating data. Accordingly, as shown in FIGS. 8A–8D, the clock signal for the first stage occurs before the clock signal for the second stage which occurs before the clock signal for the third stage which in turn occurs before the clock signal for the fourth stage. Since the previous stage clock is delayed relative to the immediate subsequent stage clock, more hold time is available for data coming from previous stage for latching in the subsequent stage. For example, compare FIG. 8D, which illustrates the clock signal of the fourth stage (the previous stage clock), with FIG. 8C, which illustrates the clock signal of the third stage (the immediate subsequent stage clock), there is a delay in the fourth stage clock relative to the third stage clock. Hence, as illustrated, there is more hold-time $T_h$ for valid data latching in the subsequent stage. This implies that the above scheme is more tolerant to clock skews introduced during place and route of clock lines, variability of clock buffer drive strengths, and variability of loading on clock lines.

In the present invention, the D-type latch circuits used in the first embodiment (e.g., latch circuits 603, 604, 608, 611, and 405) latch data received at their inputs at the same clock edge which is the rising edge. Due to the inherent characteristics (e.g., data and clock signal in opposite directions) of the present invention, there is more hold-time $T_h$ for valid data latching. As shown in FIGS. 8A–8D, for example, data latched by either latch circuit 603 or 604 (the fourth stage) during a clock cycle is available for latching (e.g., more hold-time $T_h$) by latch circuit 608 (the third stage), data latched by latch circuit 608 is available for latching (e.g., more hold-time $T_h$) by latch circuit 611 (the second stage), and data latched by latch circuit 611 is available for latching (e.g., more hold-time $T_h$) by latch circuit 405 (the first stage) before data for the next clock cycle is latched rendering the present data invalid. It should be clear to a person of ordinary skill in the art that the above scheme also works if all latches latch on the falling edge of the clock. The detailed description of a second embodiment of the present invention is provided next.

In accordance to a second embodiment of the present invention, by implementing a cascading clock gating circuitry that is propagating in a direction opposite from that of the propagating data in all the data paths and sub-data paths which diverge at a common node, it is possible to selectively disable as well as enable individual data path and sub-path as desired provided that the sub-data paths operate (e.g., process and propagate) mutually exclusively of each other. In other words, only one of the data paths and sub-paths that are parallel to each other can operate at any given time. At the same time, there is no clock skew problem so there is no required delay circuitry.

Figure 9:
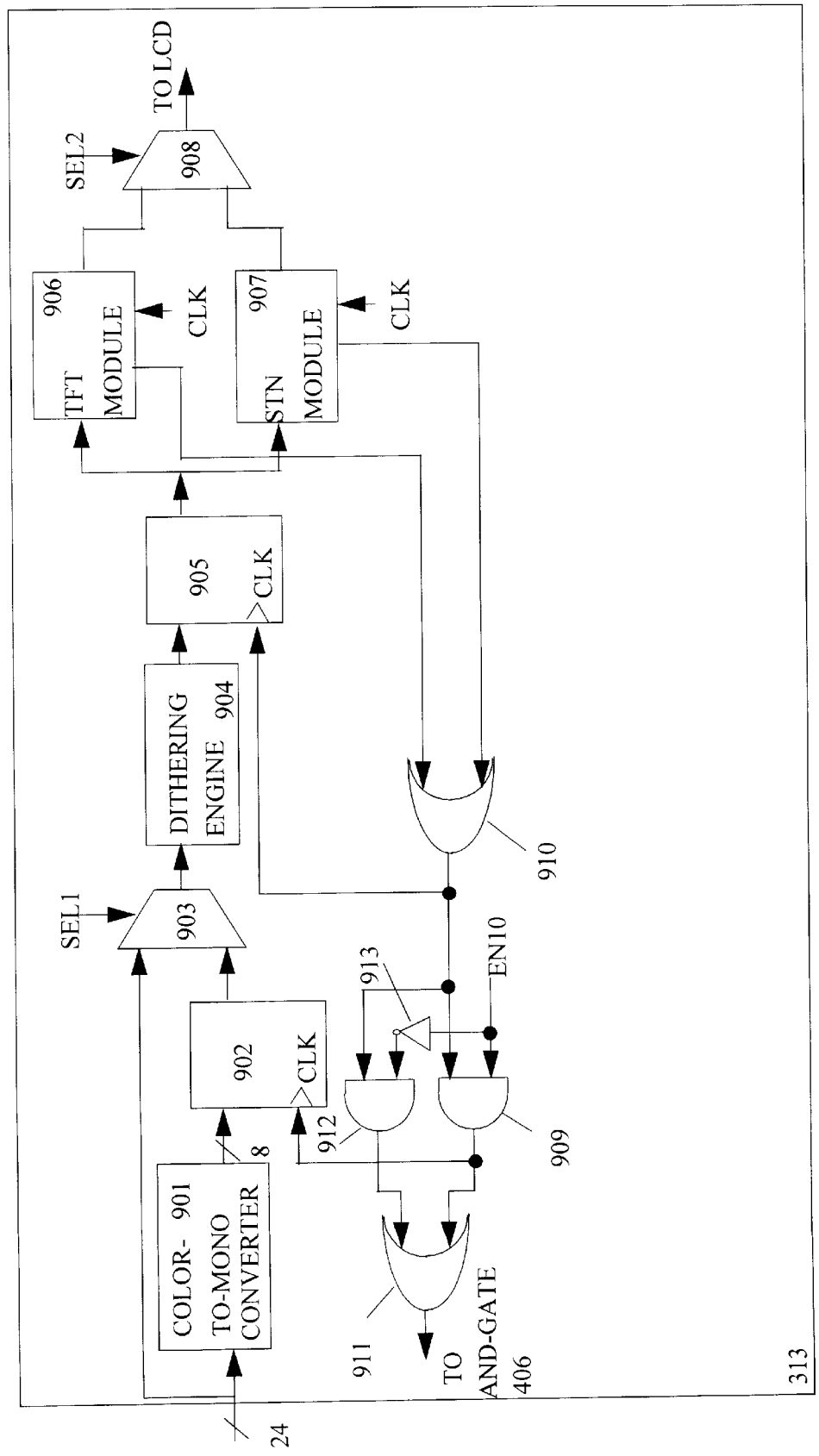
FIG. 9 is a block diagram illustrating in more details flat panel interface 313 of FIG. 3.

In the second embodiment, the invention is implemented as part of FPI 313. Reference is now made to FIG. 9 illustrating FPI 313 in more details. In general, FPI 313 consists of color-to-mono converter 901, latch circuit 902 multiplexer 903, dithering engine 904, latch circuit 905, TFT module 906, STN module 907, multiplexer 908, AND-gate 909, OR-gates 910–911, AND-gate 912, and inverter 913. Depending on the display mode selected by the user, either TFT module 906 or STN module 907 is utilized to format display data according to the desired display mode.

Since FPI 313 allows the use of a monochrome display monitor with computer system 300 and display/graphics controller 307 generally processes display data as if they are color, color-to-mono converter 901 is used to convert color display data into monochrome display data. Hence, processed data from display/graphics controller 307 is first provided to color-to-mono converter 901 (designated the fourth stage). The output of color-to-mono converter 901 is provided to the input of latch circuit 902. Latch circuit 902 is capable of handling 8 data bits concurrently. It should be clear to a person of ordinary skill in the art that latch circuit 902 can easily be designed using a combination of D-type latches or other types of latches. Latch circuit 902 is driven by a propagated clock signal outputted from AND-gate 909. The inputs to AND-gate 909 is an enable signal EN10 and the propagated clock output of OR-gate 910. When enable signal EN10 is HIGH, it indicates that color to monochrome is enabled for driving monochrome panel. The propagated clock signal outputted from AND-gate 909 is also supplied to AND-gate 406 of display/graphics controller 307. The output of latch circuit 902 is provided as an input to 2-to-1 multiplexer 903 which is controlled by select signal SEL1 that may originate, for example, from the control register (not shown) that is programmed by the CPU as indicated by the user. The other input of multiplexer 903 is the output from display/graphics controller 307. In so doing, FPI 313 can interface with both a color and a monochrome display.

Enable signal EN10 is also inverted by inverter 913 and provided to AND-gate 912. The second input provided to AND-gate 912 is the output of OR-gate 910. The outputs of AND-gates 909 and 912 are provided to OR-gate 911 which provides its output to AND-gate 406 of display/graphics controller 307. In so doing, a continuous propagated clock signal is ensured for display/graphics controller 307. This is also in accordance to the present invention which requires the clock signal to propagate in a direction opposite to that of data.

The output of multiplexer 903 is provided to dithering engine 904 (designated the third stage) which performs a pixel operation to convey as accurately as possible the color of an image when the output color bits are fewer than what are required. In other words, dithering engine 904 essentially enhances the color of the displayed image. The output of dithering engine 904 is provided to latch circuit 905 which is driven by a propagated clock signal from OR-gate 910. The inputs of OR-gate 910 are two propagated clock signals from TFT module 906 and STN module 907. The output of latch circuit 905 is provided simultaneously to both TFT module 906 and STN module 907. In so doing, FPI 313 can operate either an active-matrix (TFT) display or a passive-matrix (STN) display wherein only one display mode can be selected at any given time. As such, FPI 313 has two separate internal data paths that are mutually exclusive of each other. The outputs of TFT module 906 and STN module 907 are provided as inputs to 2-to-1 multiplexer 908 which is controlled by a select signal SEL2 that may originate, for example, from the control register (not shown) that is programmed by the CPU as indicated by the user. The output of multiplexer 908 is provided to a LCD display monitor.

As shown in FIG. 9 and in accordance to a second embodiment of the present invention, the two data paths of TFT module 906 and STN module 907 receive data from a single source and operate (e.g., process and propagate data) mutually exclusively of each other. Moreover, in accordance to the present invention, the flow direction of display data is opposite that of clock signal. As discussed above, latch circuit 902 which controls the flow of converted data to multiplexer 903 and latch circuit 905 which controls the flow of data into TFT module 906 and STN module 907 are clocked by the outputs of AND-gate 909 and OR-gate 910, respectively. Operationally, AND-gate 909 outputs a HIGH signal when both the propagated clock signal and enable signal EN10 are HIGH. Otherwise, AND-gate 909 outputs a LOW signal. In other words, latch circuit 902 and AND-gate 909 combine to act as a clock gating circuitry to enable or disable color-to-monochrome converter 901 (otherwise known as the fourth stage of the second embodiment).

Similarly, OR-gate 910 outputs a HIGH signal when either the propagated clock signal from TFT module 906 or from STN module 907 or both propagated clock signals are HIGH. Otherwise, OR-gate 910 outputs a LOW signal. Only one of the propagated clock signals from TFT module 906 and STN module 907 can be HIGH at any given time because TFT module 906 and STN module 907 are mutually exclusive. As such, latch circuit 905 and OR-gate 910 combine to act as a clock gating circuitry to enable or disable dithering engine 904. While the clock gating circuitry in the present embodiment is implemented using AND-gates and enable signals (e.g., AND-gate 909 and enable signal EN10) as well as an OR-gate (e.g., OR-gate 910) with propagated clock signals generated from AND-gate 1003 of TFT module 906 and AND-gate 1106 of STN module 907, it is clear to a person of ordinary skill in the art that a clock gating circuitry can equally be implemented using other combinational logic such as OR-gates and disable signals, an AND-gate with propagated clock signals from OR-gates, and other combinations of logic-gates.

Figure 10:
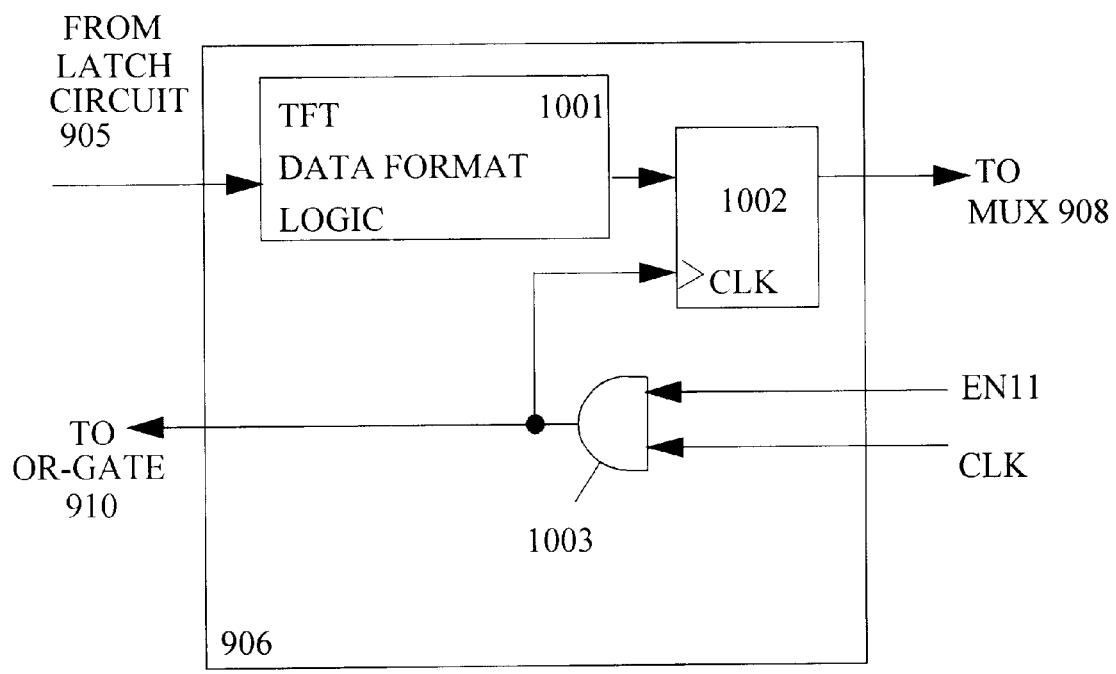
FIG. 10 is a block diagram illustrating in more details Thin Film Transistor (TFT) LCD module 901 of FIG. 9.

Reference is now made to FIG. 10 illustrating in more details TFT module 906. As shown in FIG. 10, TFT module 906 includes TFT data format logic 1001, latch circuit 1002, and AND-gate 1003. In the preferred embodiment, latch circuit 1002 is a D-type latch circuit. However, it is to be appreciated that other latch types may be employed as well.

TFT data format logic 1001 receives as input color enhanced display data from latch circuit 905. TFT data format logic 1001 formats the data received according to TFT display protocols and rules prior to sending the data to latch circuit 1002 which is driven by an output of AND-gate 1003. AND-gate 1003 has as its inputs clock signal CLK and enable signal EN11. Latch circuit 1002 is capable of handling 24 data bits concurrently. It should be clear to a person of ordinary skill in the art that latch circuit 1002 can easily be designed using a combination of D-type latches or other types of latches. Enable signal EN11 may originate from a bit in a control register (not shown) that is programmed by the CPU of processing unit 305 or from a power management circuit (not shown) that enables TFT module 906 as desired by the user. AND-gate 1003 generates a HIGH signal when both clock signal CLK and enable signal EN11 are HIGH. Otherwise, AND-gate 1003 outputs a LOW signal. As such, AND-gate 1003 and latch circuit 1002 combine to act as the clock gating circuitry for TFT module 906 (the second stage).

Figure 11:
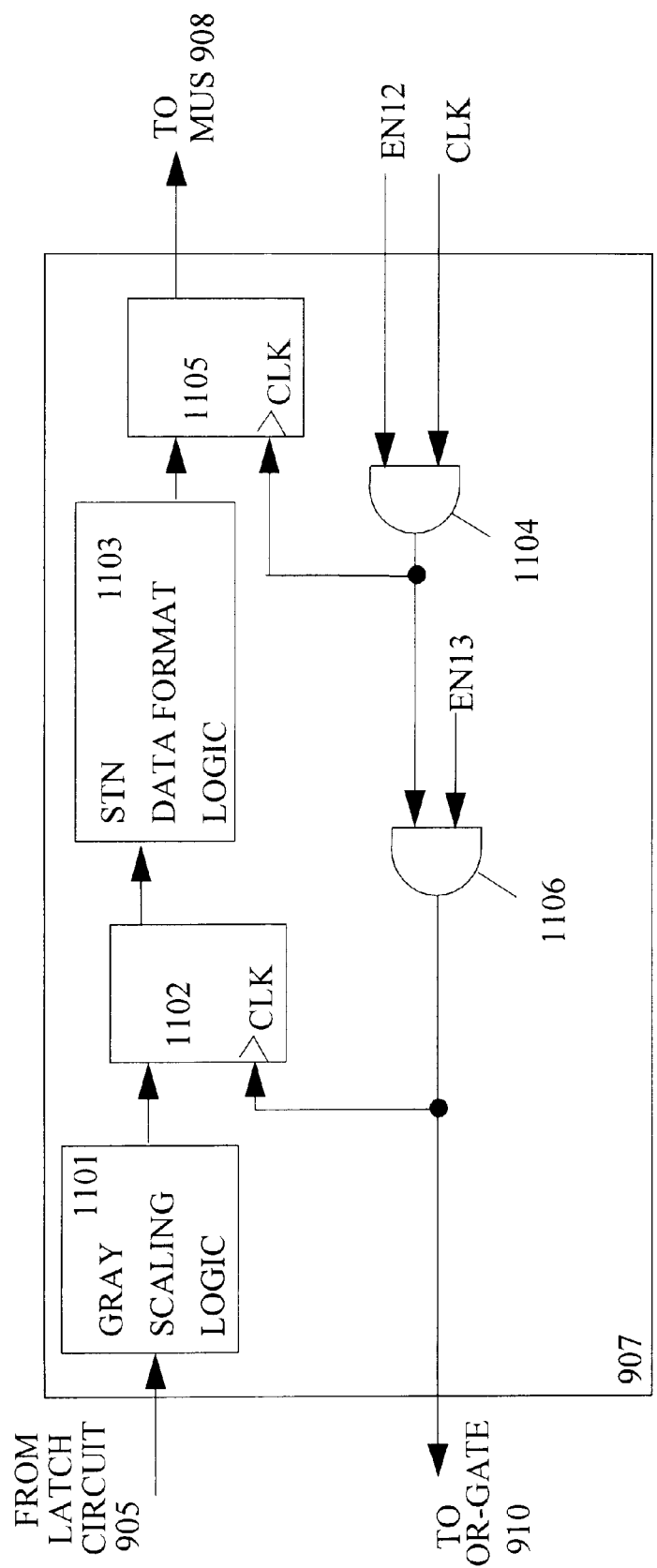
FIG. 11 is a block diagram illustrating in more details Super Twisted Nematic (STN) LCD module 902 of FIG. 9.

Referring now to FIG. 11 illustrating in more details STN module 907. As shown in FIG. 11, STN module 907 includes gray scaling logic 1101, latch circuit 1102, STN data format logic 1103, AND-gate 1104, latch circuit 1105, and AND-gate 1106. In the preferred embodiment, latch circuits 1102 and 1105 are D-type latches. However, it is to be appreciated that other latch types may be employed as well.

Gray scaling logic 1101 receives as input color enhanced display data from latch circuit 905. Gray scaling logic 1101 generates gray scale shadings using time or frame modulation technique. In a STN panel, each color-pixel is represented by 1-bit, the different gray shades can be generated by turning on and off the pixel. In other words, the brightness of a pixel depends on its energized duration. The output of gray scaling logic 1101 is provided to latch circuit 1102. Latch circuit 1102 is used to control the flow of data into STN data format logic 1103. It should be clear to a person of ordinary skill in the art that latch circuit 1102 can easily be designed using a combination of D-type latches and other types of latches.

Latch circuit 1102 is clocked by the output of AND-gate 1106 which has as its inputs a propagated clock signal from AND-gate 1104 and enable signal EN13 which may originate from a bit in the control register (not shown) that is programmed by the CPU of processing unit 305 or from a power management circuit (not shown) as selected by the user. AND-gate 1106 generates a HIGH signal when both the propagated clock signal and enable signal EN13 are HIGH. Otherwise, AND-gate 1106 outputs a LOW signal. As such, AND-gate 1106 and latch circuit 1102 combine to act as the clock gating circuitry for gray scaling logic 1101 (the second stage). The output of latch circuit 1102 is provided as an input STN data format logic 1103. STN data format logic 1103 formats the data received according to STN display protocols and rules prior to sending the data to latch circuit 1105 which is driven by the output of AND-gate 1104.

AND-gate 1104 receives as inputs clock signal CLK and enable signal EN12 which may originate from a bit in the control register (not shown) that is programmed by the CPU of processing unit 305 or from a power management circuit (not shown) as selected by the user. AND-gate 1104 generates a HIGH signal when both clock signal CLK and enable signal EN12 are HIGH. Otherwise, AND-gate 1104 outputs a LOW signal. As such, AND-gate 1104 and latch circuit 1105 combine to act as the clock gating circuitry for STN data format logic 1103 (the first stage).

Referring now FIGS. 12A–12C illustrating as examples the timing diagrams of the data path through color-to-monitor converter 901, dither engine 904, and TFT module 906. More specifically, FIG. 12A illustrates the output of AND-gate 1003 and the output of latch 1002 (i.e., the second stage), FIG. 12B illustrates the output of OR-gate 910 and the output of latch 905 (i.e., the third stage), and FIG. 12C illustrates the output of AND-gate 909 and the output of latch 902 (i.e., the fourth stage). It is clear to a person of ordinary skill in the art that similar timing diagrams of the data path through STN module 907 can be easily constructed. As such for brevity and clarity, timing diagrams of STN module 907 are not presented here.

Due to the cascading arrangement of the clock signals provided to the latches along the data path of TFT module 906 inside FPI 313 which propagate in a direction 180 degree opposite from the direction of the propagating data, the clock signals of the aforementioned three stages occur in an orderly sequence (i.e., the second, third, and then fourth stage) and propagate in a direction opposite from that of the propagating data. Accordingly, as shown in FIGS. 12A–12C, the clock signal for the second stage occurs before the clock signal for the third stage which in turn occurs before the clock signal for the fourth stage. Since the previous stage clock is delayed relative to the immediate subsequent stage clock, more hold time is available for data coming from previous stage for latching in the subsequent stage. For example, compare FIG. 12C, which illustrates the clock signal of the fourth stage (the previous stage clock), with FIG. 12B, which illustrates the clock signal of the third stage (the immediate subsequent stage clock), there is a delay in the fourth stage clock relative to the third stage clock. Hence, as illustrated, there is more hold-time $T_h$ for valid data latching in the subsequent stage. This implies that the above scheme is more tolerant to clock skews introduced during place and route of clock lines, variability of clock buffer drive strengths, and variability of loading on clock lines.

In the present invention, the D-type latch circuits used in the second embodiment (e.g., latch circuits 902, 905, 1003, 1102, and 1105) latch data received at their inputs at the rise of clock edge. Due to the inherent characteristics of the present invention, the hold-time $T_h$ is available longer for valid data latching. As illustrated, for example, in FIGS.

12A–12C, data latched by latch circuit 902 (the fourth stage) during a clock cycle is available for latching (e.g., sufficient hold-time $T_h$) by latch circuit 905 (the third stage), and data latched by latch circuit 905 is available for latching (e.g., sufficient hold-time $T_h$) by latch circuit 1003 (the second stage) before data for the next clock cycle is latched rendering the present data invalid.

The two embodiments of the present invention, a clock gating power management system, apparatus, and method are thus described. While the present invention has been described in particular embodiments, the present invention should not be construed as limited by such embodiments, but rather construed according to the below claims.

What is claimed is:

1. A clock gating apparatus coupled to a plurality of data paths connected to each other, each data path comprising one or more combinational logic circuits connected to each other in series, wherein a first combinational logic circuit in the data path receives input data for the data path and a last combinational logic circuit in the data path provides output data for the data path, for processing data such that all data propagates in a first direction, the clock gating apparatus comprising clock gating circuits, wherein in each data path, a different clock gating circuit is connected to a corresponding combinational logic circuit, the clock gating circuits of each data path are connected to each other in series, wherein a first clock gating circuit of the data path receives as inputs a clock signal and a data output from the last combinational logic circuit in the data path, the first clock gating circuit of the data path providing a propagated clock signal to the immediately subsequent clock gating circuit in the data path, the propagated clock signal from the first clock gating circuit is used to latch the data output from the last combinational logic circuit in the data path, a last clock gating circuit of the data path receiving as inputs a propagated clock signal from an immediately previous clock gating circuit in the data path and a data output from the first combinational logic circuit of the data path, the propagated clock signal from the immediately previous clock gating circuit in the data path is used to latch the data output from the first combinational logic circuit of the data path such that the clock signal propagates in a second direction, wherein each clock gating circuit receives a control signal for selectively enabling a corresponding data path portion as desired.

2. The clock gating apparatus of claim 1, wherein the data paths are parallel data paths that eventually merge together into a single data paths.

3. The clock gating apparatus of claim 2, wherein data propagates along a plurality of the parallel data paths at any given time.

4. The clock gating apparatus of claim 3, wherein the data paths are for graphics, video, and cursor data processing.

5. The clock gating apparatus of claim 1, wherein each of the clock gating apparatus comprising:

a latch circuit receiving as input data from a corresponding combinational logic circuit, the latch circuit providing latched processed data as output; and a logic-gate receiving the clock signal and the control signal as inputs, the logic-gate providing an output to the latch circuit and a subsequent clock gating circuit in the second direction.

6. The clock gating apparatus of claim 5, wherein the latch circuit is a D-type latch.

7. The clock gating apparatus of claim 5, wherein the logic-gate is an AND-gate and the control signal is an enable signal.

8. The clock gating apparatus of claim 7, wherein the logic-gate is an OR-gate and the control signal is a disable signal.

9. The clock gating apparatus of claim 1, wherein the data paths diverge from a common node and data propagates along only one of the data paths at any given time.

10. The clock gating apparatus of claim 9, wherein the data paths are for Thin Film Transistors (TFT) and Super Twisted Nematic (STN) liquid crystal displays (LCD).

11. A computer system comprising:

a central processor;

memory coupled to the central processor;

a memory controller coupled to the central processor;

a display controller coupled to the central processor, the display controller comprising a clock gating apparatus coupled to a plurality of data paths connected to each other, each data path comprising one or more combinational logic circuits connected to each other in series, wherein a first combinational logic circuit in the data path receives input data for the data path and a last combinational logic circuit in the data path provides output data for the data path, for processing data such that all data propagates in a first direction, the clock gating apparatus comprising clock gating circuits, wherein in each data path, a different clock gating circuit is connected to a corresponding combinational logic circuit, the clock gating circuits of each data path are connected to each other in series, wherein a first clock gating circuit of the data path receives as inputs a clock signal and a data output from the last combinational logic circuit of the data path, the first clock gating circuit providing a propagated clock signal to the immediately subsequent clock gating circuit in the data path, the propagated clock signal from the first clock gating circuit is used to latch processed data output from the last combinational logic circuit of the data path, a last clock gating circuit of the data path receiving as inputs a propagated clock signal from an immediately previous clock gating circuit in the data path and a data output of the first combinational logic circuit, the propagated clock signal received from the immediately previous clock gating circuit in the data path is used to latch processed data output from the first combinational logic circuit of the data path such that the clock signal propagates in a second direction, wherein each clock gating circuit receives a control signal for selectively enabling a corresponding data path portion as desired.

12. The computer system of claim 11, wherein the data paths are parallel data paths that eventually merge together into a single data paths.

13. The computer system of claim 12, wherein data is propagated along any number of the parallel data paths at any given time.

14. The computer system of claim 11, wherein the data paths diverge from a common node and data is propagated along only one of the data paths at any given time.

15. The computer system of claim 11, wherein each of the clock gating circuits comprising:

a latch circuit receiving as input data from a corresponding combinational logic circuit, the latch circuit providing latched processed data as output; and a logic-gate receiving the clock signal and the control signal as inputs, the logic-gate providing an output to the latch circuit and a subsequent clock gating circuit in the second direction.

16. In a circuit having a plurality of data paths coupled to each other, each data path having one or more combinational logic circuits connected to each other in series, wherein a first combinational logic circuit in the data path receives input data for the data path and a last combinational logic circuit in the data path provides output data for the data path, for processing data such that data propagates in a first direction, a method to conserve power comprising the steps of:

connecting a different clock gating circuit to a corresponding combinational logic circuit in each data path;

connecting the clock gating circuits in each data path together in series, wherein a first clock gating circuit of each data path receives as inputs a clock signal and a data output from the last combinational logic circuit of the data path, the first clock gating circuit providing a propagated clock signal to an immediately subsequent clock gating circuit in the data path, the propagated clock signal from the first clock gating circuit is used to latch processed data output from the last combinational logic circuit in the data path, a last clock gating circuit of each data path receiving as inputs a propagated clock signal from an immediately previous clock gating circuit in the data path and a data output from the first combinational logic circuit of the data path, the propagated clock signal received from the immediately previous clock gating circuit in the data path is used to latch processed data output from the first combinational logic circuit of the data path such that the clock signal propagates in a second direction; and selectively enabling only data path portions in use by enabling the corresponding clock gating circuits using corresponding control signals thereby conserving power.

17. The method of claim 16, wherein the data paths are parallel data paths that eventually merge together into a single data paths.

18. The method of claim 17, wherein any number of the parallel data paths is enabled at any given time.

19. The method of claim 16, wherein the data paths diverge from a common node and only one of the data paths is enabled at any given time.

20. The method of claim 16, wherein each of the clock gating circuits comprising:

a latch circuit receiving as input data from a corresponding combinational logic circuit, the latch circuit providing latched processed data as output; and a logic-gate receiving the clock signal and a control signal as inputs, the logic-gate providing an output to the latch circuit and a subsequent clock gating circuit in the second direction.

* * * * *